United States Patent [19]

Blanchard

[11] Patent Number: 4,584,351
[45] Date of Patent: Apr. 22, 1986

[54] CHLOROSULFONATION OF CHLORINATED POLYETHYLENE

[75] Inventor: Robert R. Blanchard, Brusly, La.

[73] Assignee: The Dow Chemical Company, Midland, Mich.

[21] Appl. No.: 659,046

[22] Filed: Oct. 9, 1984

[51] Int. Cl.⁴ ............................................. C08F 8/36
[52] U.S. Cl. ................................... 525/344; 525/334.1
[58] Field of Search ......................................... 525/344

[56] References Cited

U.S. PATENT DOCUMENTS 2,889,259 6/1959 Noeske et al. ...................... 204/162
4,452,953 6/1984 Benedikt ............................. 525/344

Primary Examiner—Joseph L. Schofer
Assistant Examiner—Bernard Lipman
Attorney, Agent, or Firm—D. R. Howard

[57] ABSTRACT

Chlorosulfonated polyethylene materials having (a) weight average molecular weight of from about 40,000 to about 300,000, (b) a chemically combined chlorine content of from about 20 to about 50 percent by weight of polymer, (c) a chemically combined sulfur content of from about 0.8 to about 2.5 percent by weight of polymer and (d) a 100 percent modulus of from about 0.6 to about 4.8 megapascals are prepared in an anhydrous process wherein an amorphous chlorinated polyethylene starting material is first fluidized and then exposed to a gaseous mixture of sulfur dioxide and chlorine having a ratio of sulfur dioxide to chlorine of from about 1:1 to about 16:1 in the presence of a chlorine free radical generator such as ultraviolet light, at a temperature of from about 25° to about 100° Centigrade, for a period of two hours or less.

13 Claims, No Drawings

CHLOROSULFONATION OF CHLORINATED POLYETHYLENE

BACKGROUND OF THE INVENTION

This invention relates to novel chlorosulfonated polyethylene materials and methods of preparation thereof. More particularly, the present invention relates to a finely-divided, particulate chlorosulfonated material having a weight average molecular weight of from about 40,000 to about 300,000 and a 100 percent modulus, measured in accordance with American Society for Testing and Materials (ASTM) Test D-412 of from about 0.6 to about 4.8 megapascals (MPa).

Chlorosulfonated polyethylene materials in general and various processes for preparing such materials are known. Chlorosulfonated polymers are manufactured commercially in an inert volatile solvent by simultaneously (a) chlorinating polyethylene to replace hydrogen by chlorine and (b) reacting the chlorinated polyethylene with a mixture of chlorine and sulfur dioxide to introduce chlorosulfonic groups into the chlorinated polymer. This procedure is described in detail in U.S. Pat. No. 3,296,222 issued to Dixon et al.

Chlorosulfonation of a polyethylene starting material with sulfuryl chloride in a single phase in solution is described in U.S. Pat. No. 3,299,014.

Chlorosulfonation in solution is not, however, a problem-free process. Solvents used in commercial processes to dissolve both polyethylene and the chlorosulfonated product are generally not volatile enough to be vaporized by the heat of reaction. Accordingly, it is necessary to heat the mixture of solvent and chlorinated product to remove the solvent. This is a slow and expensive procedure.

Noeske et al., in U.S. Pat. No. 2,889,259, disclose a process for the chlorosulfonation of a polyethylene starting material having a molecular weight of 80,000 to 1,400,000. The process involves fluidization of the starting material with a gaseous mixture of sulfur dioxide and chlorine at a temperature not substantially in excess of 100° Centigrade. Introduction of the gaseous mixture with ultraviolet light may enhance the chloro-sulfonation reaction. The temperature is generally within the range of 40° to 80° Centigrade. The gaseous mixture typically has a ratio of sulfur dioxide to chlorine of 1:1 to 2:1. The process provides reaction products having a sulfur content as high as about 10 percent by weight and a chlorine content as high as about 20 percent by weight. Noeske et al. state that treatment with gaseous chlorine before and/or after chloro-sulfonation raises the chlorine content to as high as 50 percent by weight.

Chlorosulfonated materials prepared in accordance with the teachings of Noeske et al. are generally not amorphous materials. That is, the materials have sufficient residual crystallinity to render them relatively inflexible and non-elastomeric.

Eckardt et al., in U.S. Pat. No. 3,542,746, disclose a two-stage process for preparing high molecular weight chlorosulfonated polyethylene. In a first stage, high density, high molecular weight polyethylene is chlorinated to a chlorine content of about 20-50 percent by weight using a procedure which reduces crystallinity of the polymer to less that one percent as determined by differential thermal analysis. In a second stage, the chlorinated polymer is treated with a mixture of sulfur dioxide and chlorine to substitute sulfonyl chloride groups on the polymer. This treatment is carried out at a temperature of 0°–100° Centigrade, either in the dark or catalyzed with actinic light, with a ratio of sulfur dioxide to chlorine in the range of 20:1 to 1:10. The two-stage process produces polymers which are substantially amorphous and which contain 25–50 percent by weight of chlorine and 0.6 to 1.5 percent by weight of sulfur. By "high molecular weight" Eckardt et al. refer to weight average molecular weights in the range of about 500,000 to 5,000,000, preferably 700,000 to 3,500,000.

Chlorosulfonated materials prepared in accordance with the teachings of Eckardt et al. have been found to be difficult, if not impossible, to process on equipment generally used in the rubber industry such as two-roll compounding mills, high intensity mixers and the like.

SUMMARY OF THE INVENTION

In one aspect, the present invention is a novel chlorosulfonated polyethylene material which is readily processable on equipment generally used in the rubber industry. The material has several distinguishing physical properties and characteristics. First, it has a sulfur content of from about 0.8 to about 2.5 percent by weight of polymer. Second, it has a chlorine content of from about 20 to about 50 percent by weight of polymer. Third, it has a weight average molecular weight of from about 40,000 to about 300,000. Fourth, it has a 100 percent modulus, measured in accordance with ASTM Test D-412, of from about 0.6 to about 4.8 MPa. Fifth, it has an ultimate tensile strength measured in accordance with ASTM Test 412, of from about 0.7 to about 17.9 MPa. Sixth, it has an ultimate elongation, measured in accordance with ASTM Test 412, of from about 200 to greater than 1000 percent. Finally, it has a relative crystallinity of from about 0 to about 15 percent.

In a second aspect, the present invention is an anhydrous process for preparing finely-divided, particulate chlorosulfonated polyethylene material. The process comprises two sequential steps.

In a first step, a finely-divided, pulverulent, free-flowing chlorinated polyethylene starting material is provided. The starting material is generally free of water and oxygen. A suitable method of removing water and oxygen from the starting material is to purge the starting material with an inert gas such as nitrogen.

The starting material has four identifying characteristics. First, it has a weight average molecular weight of from about 40,000 to about 300,000. Second, it has a chlorine content of from about 20 to about 48 percent by weight of polymer. Third, it has a 100 percent modulus, measured in accordance with ASTM Test D-412, of from about 0.5 to about 4.8 MPa. Finally, it has a relative crystallinity, as measured by X-ray diffraction, of from about 0 to about 15 percent.

In a second step, the starting material is fluidized with a gaseous mixture of sulfur dioxide and chlorine in the presence of a chlorine free radical initiator or ultraviolet radiation at a temperature within a temperature range of from about 20° to about 100° Centigrade. Fluidization is continued in conjunction with free radical initiation for a period of time sufficient to obtain a chlorosulfonated polyethylene product having a sulfur content of from about 0.8 to about 2.5 percent by weight of polymer and a chlorine content of from about 20 to about 50 percent by weight of polymer.

The gaseous mixture has a ratio of sulfur dioxide to chlorine of from about 1:1 to about 16:1. The ultraviolet

DESCRIPTION OF THE PREFERRED EMBODIMENTS

The chlorinated polyethylene starting materials suitable for purposes of the present invention are finely-divided particles which must meet four physical property criteria. First, the materials must have a weight average molecular weight of from about 40,000 to about 300,000. Second, the materials must have a chemically combined chlorine content of from about 20 to about 48 percent by weight of polymer. Third, the materials must have a 100 percent modulus, measured in accordance with ASTM Test D-412, from about 0.5 to about 4.8 MPa. Fourth, the materials must have a relative crystallinity of from about 0 to about 15 percent.

Chlorinated polyethylene materials meeting the aforementioned physical property criteria can be prepared by a chlorination procedure of the type disclosed in U.S. Pat. No. 3,454,544, the teachings of which are incorporated herein by reference thereto.

Satisfactory chlorinated polyethylene resins are readily obtained by practice of a chlorination procedure which comprehends suspension chlorination in an inert medium, of a finely divided, essentially linear polyethylene or olefin interpolymer. The interpolymer contains at least about 90 mole percent ethylene with the remainder being one or more ethylenically unsaturated monomers polymerizable therewith. The polymer is first chlorinated at a temperature below its agglomeration temperature for a period sufficient to provide a partially chlorinated polymer having a chlorine content of from about 2 to 23 percent chlorine, based on the total weight of polymer. This is followed by sequential suspension chlorination of the partially chlorinated polymer, in a particulate form, at a particular temperature. The particular temperature is, with respect to the olefin interpolymer, above its agglomeration temperature but at least about 2° Centigrade below its crystalline melting point. Sequential chlorination is continued for a period sufficient to provide a chemically combined chlorine content of up to about 48 percent by weight of polymer.

Useful ethylenically unsaturated monomers include non-aromatic hydrocarbon olefins having 3 or more carbon atoms such as propylene, butene-1, 1,4-hexadiene, 1,5-hexadiene, octene-1, 1,7-octadiene, 1,9-decadiene and the like; substituted olefins such as acrylic acid, acrylic acid esters and the like; alkenyl aromatic compounds such as styrene and its derivatives, and other known polymerizable materials.

The temperature at which chlorination normally leads to agglomeration of polymer particles depends to a large extent on the nature and molecular weight of the polymer to be chlorinated. In the case of crystalline and predominantly straight chain polyethylenes having a branching of the chains of less than 1 methyl group per 100 carbon atoms and a density of at least 0.94 grams per cubic centimeter, the temperature is above 95° Centigrade, in particular above 100° Centigrade or even above about 110° Centigrade. In the case of polyethylenes having a relatively marked branching of the chains and a lower density, the temperature is lower, about 65° Centigrade.

The temperature employed in the sequential chlorination must be greater than that employed in the initial chlorination in order to prevent (a) retention of excessive undesirable crystallinity and (b) formation of nonuniformly chlorinated polymer. The temperature employed in the sequential chlorination must also be below the crystalline melting point of the polymer being chlorinated in order to prevent accelerated particle size growth and development of undesirable agglomeration of polymer particles.

After a polyolefinic material has been suspension chlorinated to a desired degree, it may easily be filtered from suspension in the inert suspending liquid and washed and dried to prepare it for subsequent use.

The present invention is not restricted to chlorinated polyethylene resins prepared by suspension or slurry chlorination procedures. Solution chlorination and bulk, or fluidized bed, chlorination procedures may also be used provided the polymers produced thereby meet the aforementioned requirements with regard to chlorine content and residual crystallinity.

The chlorinated polyethylene starting materials are treated with a gaseous mixture of sulfur dioxide and chlorine to substitute sulfonyl chloride groups on the polymer. This treatment is suitably carried out at a temperature of from about 20° to about 100° Centigrade by passing the gaseous mixture through the chlorinated polyethylene particles, as in a fluidized bed reactor, in the presence of a chlorine free-radical generator.

The temperature at which the starting materials are treated is beneficially within a temperature range of from about 20° to about 80° Centigrade. The temperature is desirably within a temperature range of from about 20° to about 50° Centigrade. The temperature is preferably within a temperature range of from about 20° to about 45° Centigrade. A temperature of from about 25° to about 35° Centigrade is particularly preferred. It has been found that, with all other reaction parameters being equal, lower reaction temperatures are more conducive to increased rates of sulfonation than higher reaction temperatures.

The gaseous mixture has a ratio of sulfur dioxide to chlorine which is suitably from about 1:1 to about 16:1, beneficially from about 1:1 to about 8:1, and preferably from about 1:1 to about 4:1. It has been found that at ratios of from about 1:1 to about 8:1, rates of sulfonation are greater than they are for ratios greater than 8:1. Ratios as great as 32:1 and even higher can be used if desired. They are counter-productive, however, because the rate of sulfonation is greater at lower ratios. Ratios of less than about 1:1 may be used but they are undesirable because they favor chlorination over sulfonation.

If an accelerated rate of chlorosulfonation is desired, the reaction may be assisted by the employment of ultraviolet light and/or small quantities of a chlorine free-radical generating catalyst. The ultraviolet light has a wavelength suitable for generating chlorine free-radicals. Ultraviolet light alone is generally sufficient to produce satisfactory results.

A catalyst, where used, must have certain characteristics in order to be suitable for purposes of the present invention. First, it must be capable of contacting or being intimately admixed with the chlorinated polyethylene starting materials. Second, it must be active over at least a portion of the temperature range used for treating the starting material with the gaseous mixture. Third, it must be sufficiently active to allow reasonable amounts thereof to be used. Various azo-type compounds and peroxides, such as tertiary butyl peroxide and the like, are suitable free-radical catalysts.

Preparation of chlorosulfonated polyethylene materials is accomplished within a time period which is beneficially from about 15 to about 120, desirably from about 15 to about 70 and preferably from about 15 to about 35 minutes. A time period of less than about 15 minutes is not sufficient to attain the desired sulfur content. A time period of greater than 120 minutes may be used. It is, however, neither necessary nor economical.

The chlorosulfonated polyethylene produced in accordance with the present invention has a chlorine content which is beneficially from about 20 to about 50, preferably from about 25 to about 42 percent by weight of polymer.

The chlorosulfonated polyethylene prepared in accordance with the present invention has a sulfur content which is beneficially from about 0.8 to about 2.5, desirably from about 0.9 to about 1.4 and preferably from about 1.0 to about 1.2 percent by weight of polymer.

The chlorosulfonated polyethylene prepared in accordance with the present invention has a weight average molecular weight which is beneficially from about 40,000 to about 300,000, desirably from about 90,000 to about 250,000 and preferably from about 120,000 to about 180,000.

When the compositions of the invention contain a vulcanizing package, the package may include magnesium oxide or lead oxide, preferably a high activity magnesium oxide for toxicological reasons, and optionally, one or more sulphur-containing accelerators such as mercaptobenzothiazole, benzothiazyl disulphide or dipentamethylene thiuram tetrasulphide. Magnesium oxide, when used, is present in an amount of from about 3 to about 7 parts by weight. Lead oxide, when used, is present in an amount of from about 10 to about 30 parts by weight. Sulphur-containing accelerators are generally used in amounts of from about 0.5 up to about 3 parts by weight. All parts by weight are based on 100 parts by weight of polymer. Other vulcanizing packages known by those skilled in the art to be suitable for vulcanizing chlorosulfonated polyethylene may also be used.

The compositions of the invention may also contain fillers, such as carbon black, mineral fillers or carbon black-mineral filler mixtures, various processing aids and antioxidants. Illustrative fillers other than carbon black include titanium dioxide, barium sulfate, kaolin clay, diatomaceous earth, powdered talc and calcium sulfate. Suitable processing aids may include the well known plasticizers and softeners such as low molecular weight polyethylenes, the aromatic hydrocarbon resins, polyethylene glycol, aromatic hydrocarbon oils and the like. Antioxidants may be readily selected from among those well known in the art.

The following examples are for purposes of illustration only and are not to be construed as limiting the scope of the present invention. All parts and percentages are by weight unless otherwise stated.

First Chlorosulfonation Apparatus

A General Electric model RS sunlamp was spaced apart from a vertically arranged 2.5 centimeter diameter Pyrex TM tube having an effective length of about 40 centimeters. A porous sintered glass plate was fitted into one end (hereinafter referred to as the "bottom end") of the tube. The term "effective length", as used herein, means a length immediately above the sintered plate which is exposed to ultraviolet light. A gas supply line was connected to the bottom end of the tube. The gas supply line was connected to (a) a gaseous chlorine supply line, (b) a gaseous sulfur dioxide supply line and (c) a gaseous nitrogen supply line. The gas supply line was also fitted with an overpressure relief valve. By a suitable arrangement of check valves, a ratio of gaseous sulfur dioxide to gaseous chlorine could be established. Similarly, gaseous nitrogen rather than a mixture of sulfur dioxide and chlorine could be supplied. A cap connected to a scrubber was fitted into a second end (hereinafter referred to as the "top end") of the tube.

The first chlorosulfonation apparatus had a capacity of 30 grams of polymer. A gas flow rate of about 0.3 meters per second was sufficient to fluidize 30 grams of polymer.

Second Chlorosulfonation Apparatus

An ultraviolet light source was spaced apart from a Pyrex TM tube having a diameter of about 10 centimeters, a length of about 90 centimeters and an effective length of about 25 centimeters. The light source was either (a) the General Electric model RS sunlamp or (b) a Spectraline model CL100 ultraviolet spotlight having a 100 watt bulb and emitting ultraviolet light at a nominal wavelength of 3600 Angstroms.

A 30 centimeter portion of the inside of one end (hereinafter referred to as the "bottom end") of the tube was covered with a 0.16 centimeter sheet of a fluorinated ethylenepropylene fluorocarbon polymer commercially available from E. I. duPont de Nemours and Co. under the trade designation Teflon TM.

A truncated hollow right cylinder conical insert made of polytetrafluoroethylene was fitted into the bottom end of the tube. The conical insert had a large opening and a small opening. The large opening had a diameter of about 10 centimeters. The large opening was positioned so that it was remote from rather than proximate to the bottom end of the tube. The small opening had a diameter of about 3.3 centimeters and was positioned so that it was proximate to the bottom end of the tube.

Adjacent to the conical insert and arranged so as to cover the bottom end of the tube was a screen assembly. The screen assembly had four layers arranged as follows: (a) a 200 mesh screen of polytetrafluoroethylene; (b) a woven mat made of glass fibers, commercially available from Owens-Corning Fiberglas Corporation under the trade designation Fiberglas TM; (c) a 400 mesh stainless steel screen; and (d) a 20 mesh stainless steel screen. Layer (a) was placed next to the conical insert. A metal funnel, having the larger opening adjacent layer (d) of the screen assembly was connected to the bottom end of the tube. The effective length was measured from the screen assembly rather than from the sintered glass plate as in the first apparatus.

The stem, or small opening, of the funnel was connected to a gas supply line which in turn was connected to an overpressure relief valve set at about 0.35 MPa, a gaseous chlorine supply line, a gaseous sulfur dioxide supply line, and a gaseous nitrogen supply line. By a suitable arrangement of check valves and blocking valves, a ratio of gaseous chlorine to gaseous sulfur dioxide could be established. Similarly, gaseous nitrogen rather than the mixture of gaseous chlorine and gaseous sulfur dioxide could be supplied via the gas supply line.

One thermocouple was placed inside the tube near the screen assembly to measure powder temperature. A second thermocouple was placed inside the metal funnel to measure inlet temperature of the nitrogen gas or nitrogen/ halogen gas mixture. A cap connected to a scrubber was fitted with a second end of the tube (hereinafter referred to as the "top end"). The second apparatus had a capacity of 450 grams.

Blend Used to Test for Vulcanization Activity

The following blend of materials was used to determine whether a polymer was suitable for use as a chlorosulfonated polyethylene material:

| Parts | Component |
|---|---|
| 100 | Polymer |
| 50 | carbon black, commercially available from Cabot Corporation under the trade designation N774. |
| 30 | plasticizer, commercially available from Monsanto Company under the trade designation Santicizer TM 711 |
| 2 | dipentamethylene thiuram tetrasulfide |
| 0.5 | benzothiazyl disulfide |
| 27 | litharge |

An oscillating disk rheometer was used to check blends of materials for vulcanization activity by measuring change in torque. Torque measurements were made in accordance with ASTM Test D-2084 at a temperature of 160° Centigrade and a frequency of oscillation of 1.7 Hertz with an arc of three degrees. The change in torque, or Delta T, was determined by subtracting the minimum torque from the maximum torque.

EXAMPLE 1

Preparation of Chlorosulfonated Polyethylene of the Present Invention

The first chlorosulfonation apparatus was loaded with 30 grams of a chlorinated polyethylene starting material. The chlorinated polyethylene was made from high density polyethylene having a nominal weight average molecular weight of about 240,000. The chlorinated polyethylene had a nominal chemically combined chlorine content of about 36 percent of polymer weight, a 100 percent modulus of one MPa and a relative crystallinity of less than about two percent. It was commercially available from The Dow Chemical Company under the trade designation CPE 3615.

The chlorinated polyethylene starting material was purged with gaseous nitrogen for a period of 30 minutes. The nitrogen had a temperature of about 30° Centigrade and was supplied at a rate of about 0.3 meters per second which was sufficient to fluidize the starting material. The nitrogen purge was used to remove generally all oxygen and atmospheric moisture from the starting material.

After the 30 minute period, the gaseous nitrogen flow was stopped. The starting material was then re-fluidized with a flow of a gaseous mixture of sulfur dioxide and chlorine having a ratio of sulfur dioxide to chlorine of about 16:1. The flow was adjusted for good fluidization, a flow rate of about 0.3 meters per second. The sunlamp was turned on for a period of 2 hours while the starting material continued to be fluidized with the gaseous mixture at a temperature of 30° Centigrade.

After the period of 2 hours, the sunlamp and the flow of the gaseous mixture was discontinued. The polymer was then fluidized again with a flow of gaseous nitrogen for a period of 30 minutes at a temperature of about 40° Centigrade to remove acid gases. After the period of 30 minutes, the gaseous nitrogen flow was stopped and the polymer was recovered.

The material prepared in this Example 1 was compared with the chlorinated polyethylene starting material (hereinafter referred to as "Comparative Example A") for vulcanization activity using the blend and rheometer identified hereinabove. The blend prepared with the material produced in Example 1 showed a torque gain or Delta torque of 88.1 deciNewton. Meter (dN.M) whereas that prepared with the material of Comparative Example A showed a torque gain of only 2.3 dN.M. These blends and a third blend prepared with a chlorosulfonated polyethylene material commercially available from E. I. duPont de Nemours & Company under the trade designation Hypalon TM 40 (hereinafter designated as "Comparative Example B") were subjected to physical property testing. Comparative Example B showed a torque gain of 86.5 dN.M. The physical property tests are set forth in Table I. The results of the testing are presented in Table II.

TABLE I
PHYSICAL PROPERTY TESTS

| Hardness (Share A) | ASTM D-2240 |
| 100% Modulus | ASTM D-412 |
| Ultimate Tensile | ASTM D-412 |
| % Elongation | ASTM D-412 |

TABLE II
PHYSICAL PROPERTY TEST RESULTS

| Polymer Source (Example/ Comparative Example) | Shore A Hardness | 100% Modulus (megapascals) | Ultimate Tensile (megapascals) | Percent Elongation |
|---|---|---|---|---|
| 1 | 69 | 8.0 | 23.0 | 215 |
| A | 51 | 1.0 | 5.9 | 777 |
| B | 58 | 5.8 | 19.0 | 220 |

The data presented in Table II shows that the material prepared in Example 1 responded well to a typical chlorosulfonated polyethylene vulcanization package. Chlorinated polyethylene (Comparative Example A), on the other hand, did not respond well as the data is characteristic of a non-crosslinked polymer. Similar results are obtained with other chlorosulfonated polymers prepared in accordance with the present invention.

EXAMPLES 2–4 AND COMPARATIVE EXAMPLES C–D

Reaction Time Study

Using the second chlorosulfonation apparatus, the procedure set forth for Example 1 was duplicated except that the time interval was varied as shown in Table III. Torque gain is shown in Table III under the column headed Delta T.

TABLE III
REACTION TIME STUDY

| Example/Comparative Example | Reaction Time (hours) | Sulfur dioxide:Chlorine Ratio | Percent Sulfur | Percent Chlorine | Delta T (dN · M) |
|---|---|---|---|---|---|
| 2 | 0.5 | 16:1 | 1:63 | 34 | 42.9 |
| 3 | 1 | 16:1 | 1.79 | 33 | 72.3 |
| 4 | 2 | 16:1 | 2.20 | 35 | 82.5 |
| C | 4 | 16:1 | 2.65 | 35 | 91.5 |
| D | 6 | 16:1 | 2.24 | 35 | 82.5 |

The data presented in Table III clearly shows two points. First, sulfonation occurred rapidly. A predominant proportion of the sulfonation occurred within the first 30 minutes. Second, straight chlorination of the starting material did not occur at a rate sufficient to significantly change the chlorine content of the polymer. Similar results are obtained with other starting materials and reaction parameters, all so hereinabove specified.

EXAMPLES 5-7 AND COMPARATIVE EXAMPLE E

Effect of Ultraviolet Light Study

Using the second chlorosulfonation apparatus, the procedure set forth in Example 1 was duplicated except that the ultraviolet light source was varied. The light source used is shown in Table IV together with sulfur and chlorine content of the resultant polymers. The following code is used to represent the light source:
A—The General Electric Model RS sunlamp
B—The Spectraline Model CL100 spotlight

TABLE IV
EFFECT OF ULTRAVIOLET LIGHT

| Example/Comparative Example | Reaction Time (hours) | Temperature (°Centigrade) | Final Chlorine Content (%) | Final Sulfur Content (%) | Sulfur Dioxide to Chlorine Ratio | Light Source |
|---|---|---|---|---|---|---|
| 5 | 2 | 30 | 35.3 | 1.23 | 16:1 | A |
| 6 | 2 | 30 | 35.0 | 1.71 | 16:1 | B |
| 7 | 2 | 30 | 35.4 | 2.16 | 16:1 | A + B |
| E | 2 | 30 | 34.1 | 0.47 | 16:1 | None |

The data presented in Table IV amply demonstrates that ultraviolet light enhances the sulfonation reaction. Similar results are obtained with other chlorosulfonated polyethylenes which are representative of the present invention.

EXAMPLES 8-9 AND COMPARATIVE EXAMPLE F

Effect of Ratio of Sulfur Dioxide to Chlorine Study

Using the second chlorosulfonation apparatus, the procedure set forth in Example 1 was duplicated except that the ratio of sulfur dioxide to chlorine was varied and a different chlorinated polyethylene starting material was used. The ratio is shown in Table V together with the sulfur and chlorine content of the resultant polymers. The chlorinated polyethylene starting material had (1) a nominal chemically combined chlorine content of 39 percent of polymer weight, (2) a 100 percent modulus of about 2.2 MPa and (3) a relative crystallinity of less than about two percent. It was prepared by chlorinating high density polyethylene having a molecular weight of about 153,000. The chlorinated polyethylene was commercially available from The Dow Chemical Company under the trade designation CPE 631. The code used in Examples 5-7 above to represent the light source is also used in Table V.

TABLE V
EFFECT OF RATIO OF SULFUR DIOXIDE TO CHLORINE

| Example/Comparative Example | Reaction Time (hours) | Temperature (°Centigrade) | Final Chlorine Content (%) | Final Sulfur Content (%) | Sulfur Dioxide to Chlorine Ratio | Light Source |
|---|---|---|---|---|---|---|
| 8 | 2 | 30 | 39.8 | 1.58 | 8:1 | A |
| 9 | 2 | 30 | 38.6 | 0.61 | 16:1 | A |
| F | 2 | 30 | 38.9 | 0.29 | 32:1 | A |

The data presented in Table V clearly shows the marked effect which the ratio of sulfur dioxide to chlorine has upon the final polymer product. Contrary to what might otherwise be expected, a low sulfur dioxide to chlorine ratio results in a more rapid sulfonation reaction and a higher final sulfur content than a high sulfur dioxide to chlorine ratio. Similar results are obtained with other ratios and with other starting materials as specified hereinabove in conjunction with other reaction parameters, also as specified hereinabove.

What is claimed is:
1. An anhydrous process for preparing finely-divided, particulate chlorosulfonated polyethylene, the process comprising two sequential steps:
   A. providing a finely-divided, pulverulent, free-flowing chlorinated polyethylene starting material which is generally free of water and oxygen, the starting material (1) being prepared from high density polyethylene having a weight average molecular weight of from about 40,000 to about 300,000, and (2) having (a) a chlorine content of from about 20 to about 48 percent by weight of polymer, (b) a 100 percent modulus of from about 0.5 to about 4.8 Mega Pascals, and (c) a relative crystallinity of from about 0 to about 15 percent; and B. fluidizing the starting material with a gaseous mixture of sulfur dioxide and chlorine while said starting material is in the presence of chlorine free radicals, the gaseous mixture having a ratio of sulfur dioxide to chlorine of from about 1:1 to about 16:1, and the chlorine free radicals being generated by a means selected from the group consisting of ultraviolet light radiation having a wavelength sufficient to generate chlorine free radicals and chemical free radical initiators at a temperature within a temperature range of from about 20° to about 100° Centigrade and for a period of time sufficient to obtain chlorosulfonated polyethylene having a sulfur content of from about 0.8 to about 2.5 percent by weight of polymer and a chlorine content of from about 20 to about 50 percent by weight of polymer.

2. The process of claim 1 wherein the period of time is from about 15 to about 120 minutes.

3. The process of claim 1 wherein the period of time is from about 15 to about 70 minutes.

4. The process of claim 1 wherein the period of time is from about 15 to about 35 minutes.

5. The process of claim 1 wherein the temperature is within a temperature range of from about 20° to about 80° Centigrade.

6. The process of claim 1 wherein the temperature is within a temperature range of from about 20° to about 50° Centigrade.

7. The process of claim 1 wherein the temperature is within a temperature range of from about 20° to about 45° Centigrade.

8. The process of claim 1 wherein the chlorosulfonated polyethylene has a sulfur content of from about 0.9 to about 1.4 percent by weight of polymer.

9. The process of claim 1 wherein the chlorosulfonated polyethylene has a sulfur content of from about 1.0 to about 1.2 percent by weight of polymer.

10. The process of claim 1 wherein the chlorosulfonated polyethylene has a weight average molecular weight of from about 90,000 to about 250,000.

11. The process of claim 1 wherein the chlorosulfonated polyethylene has a weight average molecular weight of from about 120,000 to about 180,000.

12. The process of claim 1 wherein the ratio of sulfur dioxide to chlorine is from about 1:1 to about 8:1.

13. The process of claim 1 wherein the ratio of sulfur dioxide to chlorine is from about 1:1 to about 4:1.

* * * * *